United States Patent [19]

Anderson

[11] 4,281,326

[45] Jul. 28, 1981

[54] AUTOMATIC COLLISION WARNING TARGET DISPLAY SYSTEM

[76] Inventor: Lawrence F. Anderson, 344 Westline Dr., #C121, Alameda, Calif. 94501

[21] Appl. No.: 680,685

[22] Filed: Apr. 27, 1976

[51] Int. Cl.$^3$ .............................................. G01S 13/00
[52] U.S. Cl. ............................ 343/5 EM; 343/7 ED; 343/7.3
[58] Field of Search ............. 343/7 ED, 7.3, 112 CA, 343/5 EM

[56] References Cited

U.S. PATENT DOCUMENTS

| | | | |
|---|---|---|---|
| 2,489,297 | 11/1949 | Labin et al. | 328/108 |
| 2,891,198 | 6/1959 | Gleason | 343/7.3 |
| 3,151,322 | 9/1964 | Hildebrandt | 343/7.3 |
| 3,188,631 | 6/1965 | Birtley | 343/9 |
| 3,403,396 | 9/1968 | Popta et al. | |
| 3,646,557 | 2/1972 | Scheer | 343/5 EM |
| 3,648,283 | 3/1972 | Busch et al. | 343/5 EM |
| 3,660,846 | 5/1972 | Anderson | 343/7 ED |
| 3,845,481 | 10/1974 | Danzer et al. | 343/7.3 |

OTHER PUBLICATIONS

Skolnik, Radar Handbook, 1970, pp. 6.17–6.18, Gr. 222.

*Primary Examiner*—Stephen C. Buczinski
*Attorney, Agent, or Firm*—Alvin E. Hendricson

[57] ABSTRACT

A warning system that operates with an existing radar system to display on the scope thereof a first pair of traces of adjustable maximum and minimum range defining an early warning collision range, provides a bearing trace through a radar-detected object or target and brackets the object with range lines across an adjustably limited bearing sector while actuating a warning alarm. The system also defines an alarm zone of lesser range than the warning zone and operates to activate a further alarm for any radar-detected object or target therein. Additionally, the system may incorporate a tow warning capability for identifying the straying of a towed barge, for example, from a predetermined tow zone.

9 Claims, 7 Drawing Figures

AUTOMATIC COLLISION WARNING TARGET DISPLAY SYSTEM

BACKGROUND OF INVENTION

Conventional radar systems are commonly provided upon ships, for example, for identifying the presence of relatively moving objects with which the ship might collide. The conventional radar system incorporates an oscilloscope or scope generally in the form of a position plan indicator (PPI) upon which a luminous radial line sweeps over the area scanned by the radar and produces a bright spot on the screen at the location of any object which reflects the electromagnetic emanations from the set. Although this information is normally displayed on the scope of a radar set, the operator of a ship, for example, is under no obligation to take any action because of the identification of objects thereby, even though the information as to their presence and relative location is visually displayed. Further to conventional radar systems there have been developed a number of highly complex radar tracking systems; however, the complexity and cost of such systems normally precludes their use as an assistance to the operator of a ship, airplane, or the like.

There has been developed an automatic collision warning system, as shown in U.S. Pat. No. 3,660,846, which operates with a conventional radar system to automatically actuate an alarm system upon the location by the radar system of an object within a predetermined area. This then requires the operator of a ship or the like carrying the collision warning system to make some decision with regard to the located object. If, for example, the object is of no danger to the navigation of the ship, for example, the operator may merely deactivate the alarm; however, if the object is on a collision course, the operator would take some evasive action. This then forces upon the operator of a ship or the like the necessity of making a decision and taking some action with regard to any radar-detected object within some predetermined distance from the ship or the like carrying the system.

The present invention comprises an improvement upon the system of the above-noted U.S. Pat. No. 3,660,846 and reference is made thereto and art cited therein for further background of the present invention.

The system of the present invention provides automatic collision warning with numerous and substantial refinements and added capabilities over the system of the above-noted patent. In particular, the present invention provides a warning range zone of controllable depth and placement with a controllable azimuth sector width.

SUMMARY OF INVENTION

The system of the present invention provides an automatic warning of the possibility of collision between relatively movable objects and in the following description the invention is referenced to a ship collision warning system, although the invention is equally applicable to other applications including fixed hazards to navigation such as an offshore drilling platform or for inclusion in ground based air traffic control radar and early warning radar systems. The present system cooperates with a conventional radar set wherein electromagnetic radiation is directionally propogated from a scanning antenna which also receives such radiation as is reflected from objects in the path thereof and the range and bearing of such objects is normally displayed on a scope such as a Plan Position Indicator (PPI). The present invention operates upon signals from a conventional radar set to adjustably establish a warning zone, i.e., a minimum and maximum range over an adjustable azimuth sector of interest, wherein signals from radiation reflected by objects in such zone are verified and employed to establish a limited azimuth or bearing sector and to produce warning signals therefrom. The system hereof produces on the PPI scope of a radar set a visual indication of the limits of the range zone and azimuth sector and a bearing tracer line through the detected object which automatically tracks a target in the warning zone.

The system of the present invention also establishes an adjustable inner alarm zone and any radar-detected object therein produces an alarm signal in the nature of an imminent collision alarm which, if not intentionally deactivated within a limited period, will sound an emergency alarm, for example, or key-operate a ships's whistle. The present invention in operation requires a ship's operator to take some positive action at least to deactivate the alarm hereof when a radar target appears in a preselected zone so that a decision as to possibility of collision must be made by the operator.

The system of the present invention provides not only a PPI display but also provides a digital readout of range and bearing of objects appearing in the adjustably positioned range zones hereof. Furthermore, the capability of the present invention to establish predetermined range zones and azimuth sectors may be employed for various special applications other than collision warning, such as warning of straying or parting of tow lines of barges or the like being towed by a ship or boat equipped with the present invention.

The system of this invention is basically a simple and relatively uncomplicated addition to a conventional radar system and the invention has capabilities which are highly desirable for collision warning and information display in connection therewith. The invention is also advantageous in providing an operator with the capability of adjusting the azimuthal extent of interest so that signals from an accompanying ship or an adjacent shore line may be excluded and yet the invention still be employed for collision warning.

DESCRIPTION OF FIGURES

The present invention is illustrated as to particular preferred embodiments thereof in the accompanying drawings wherein:

FIG. 4 is a block diagram of the alarm and display of FIG. 1;

DESCRIPTION OF PREFERRED EMBODIMENTS

Figure 1:
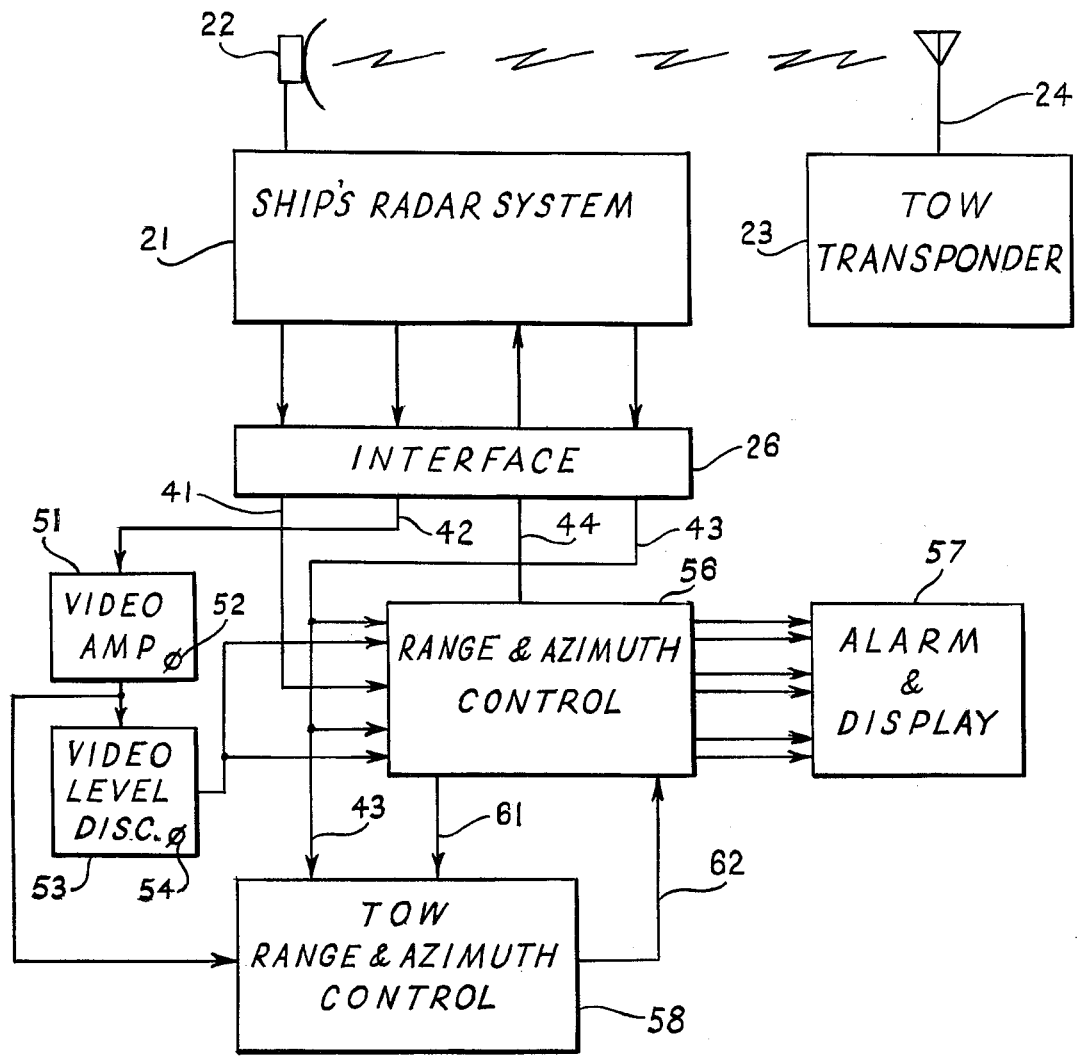
FIG. 1 is a block diagram of a preferred embodiment of the present invention.

The present invention is generally illustrated as to a first preferred embodiment thereof in the block diagram of FIG. 1 and in this illustration and those following the present invention is referenced to ship collision warning systems although the invention is not limited to this application. Referring now to FIG. 1 there will be seen a conventional ship radar system 21 having a directional rotatable antenna 22 which transmits elecromagnetic radiation and receives echoes thereof from solid objects in the path of the radiation. The radar system 21 may be wholly conventional and may, in fact, comprise a radar system already installed upon a boat or ship, for the present invention is adapted to operate therewith. In FIG. 1 there is illustrated a tow transponder 23 having an antenna 24 thereon for a particular application and capability of the present invention, as further described below.

Figure 2:
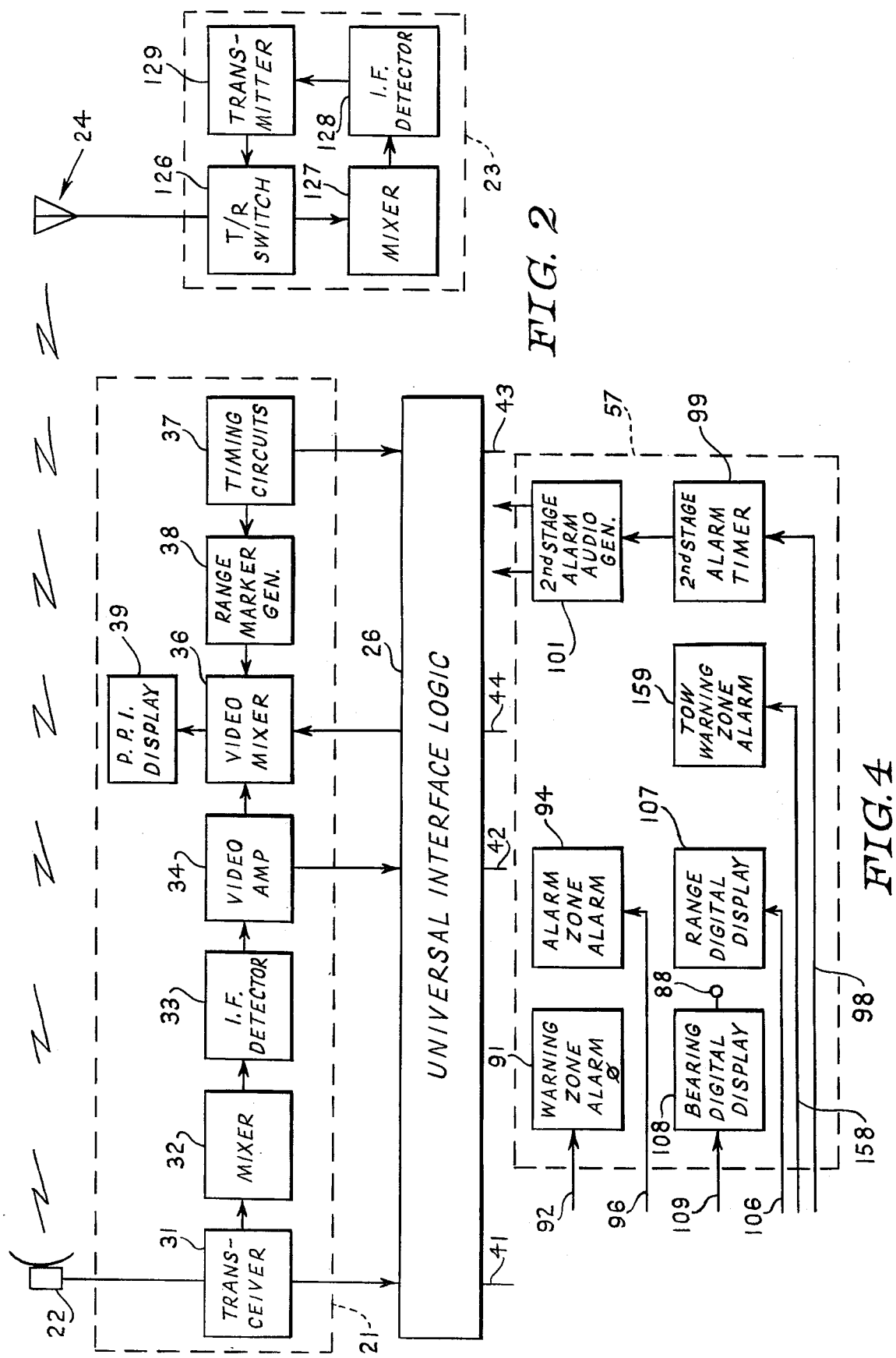
FIG. 2 is a block diagram of the ship radar system and tow transponder of FIG. 1.

Connected to the radar system 21 is a universal interface logic unit 26 which serves to provide compatability of signals between the radar system 21 and the present invention. This unit includes differential amplifiers and automatic switching means and will accept either a positive or negative going signal of various amplitudes from the radar system and produce an output signal of predetermined polarity and amplitude as required by the present invention. The conventional ship radar system as illustrated in FIG. 2 includes a transceiver 31 connected to the antenna 22 and connected through a mixer 32, an IF detector 33 and video amplifier 34 to a video mixer 36. Timing circuits 37 are connected to a range marker generator 38 that is connected to the video mixer 36. The output of the mixer 36 is applied to a PPI display 39. The PPI 39 includes an oscilloscope face upon which a trace line revolves depicting the revolution of the radar antenna 22 and upon which there are displayed luminous targets at appropriate positions as established by radar signals reflected to the antenna 22. The present invention employs certain signals from the radar set 21 and output lines from the interface 26 carry heading marker signals from the transceiver on line 41, radar video signals from the video amplifier 34 on line 42 and trigger signals from the timing circuits 37 on line 43. An input line 44 from the present invention applies signals through the interface 26 to the video mixer of the radar set. It is noted again that the interface or universal interface logic 26 incorporates conventional circuitry, such as differential amplifier circuits, that process incoming video, trigger and heading marker signals into the desired polarity and amplitude for use by the internal circuitry of the present invention.

Referring again to FIG. 1 of the drawings, it will be seen that the radar video signals from the radar set are applied through line 42 to a video amplifier 51 having a sensitivity control 52 and thence to a video level discriminator 53. The video amplifer 34 of the radar set has an output which contains information relative to the amplitude, pulse width and the distance or range of signals received by the system. The sensitivity control 52 of the video amplifier 51 establishes the amplitude of signals to be passed by the amplifier and the video level discriminator 53 has a threshold control 54 for comparing the video level of the pre-set adjustable voltage reference to thus pass only signals above an adjustable threshold level.

The present invention includes a range and azimuth control 56 receiving inputs from the video level discriminator 53 and from input lines 41 and 43 from the radar system. The range and azimuth control 56 is connected to an alarm and display unit 57 and in the embodiment of FIG. 1 there is also provided a tow range and azimuth control 58 having an input from the video amplifier 51 via line 59, the trigger signal via line 43 and a control signal via line 61 from the range and azimuth control 56. An output line 62 extends from the tow range and azimuth control 58 to the range and azimuth control 56.

Figure 3:
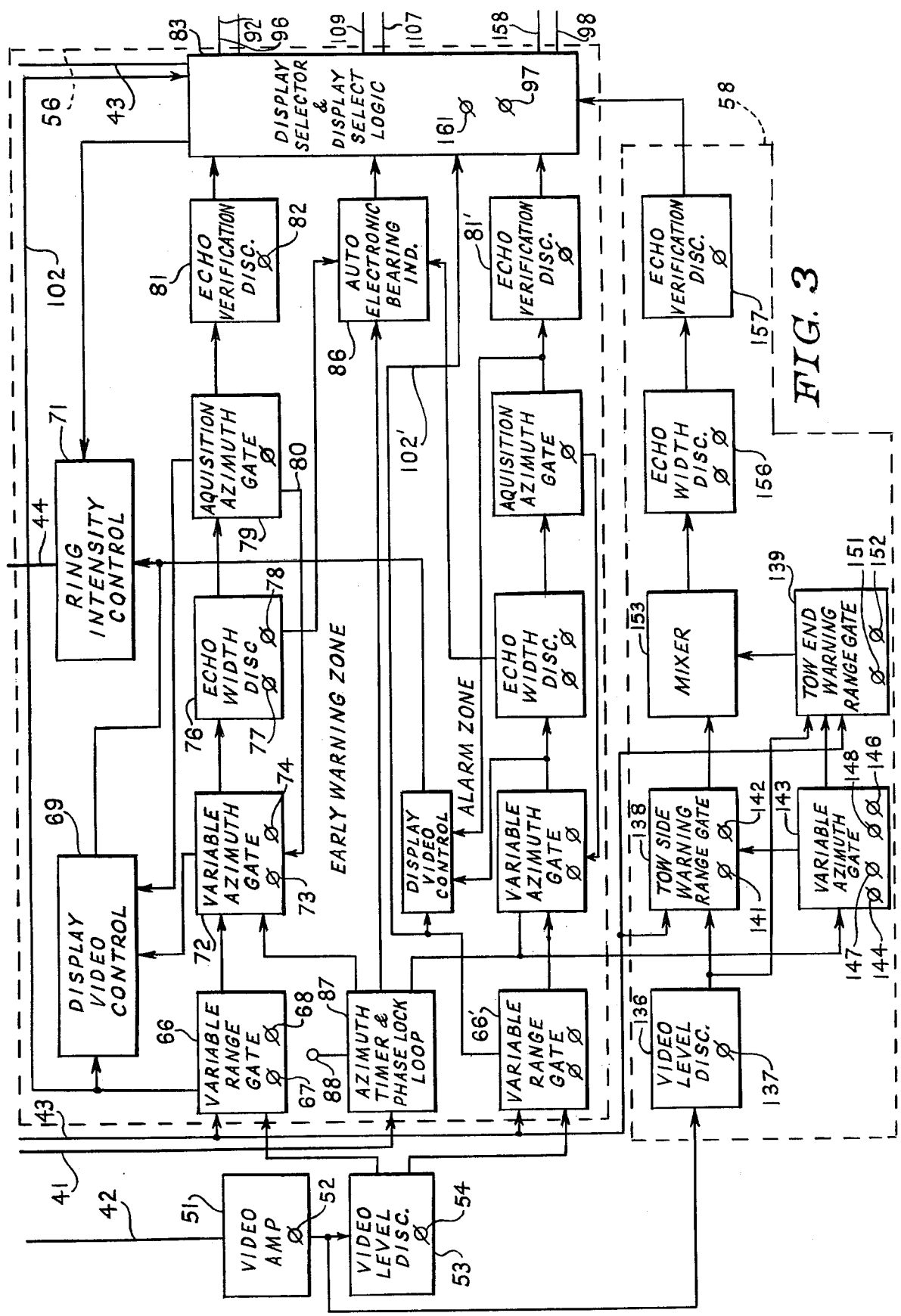
FIG. 3 is a block diagram of the range and azimuth control of FIG. 1 and a block diagram of the tow range and azimuth control of FIG. 1.

Considering now the range and azimuth control unit 56, as illustrated in FIG. 3, there will be seen to be provided a pair of parallel channels denominated in the drawing as "early warning zone" and "alarm zone" and, inasmuch as the elements of each channel are the same, only the upper or early warning zone channel is herein described in detail with the elements of the alarm zone channel being identified by the same numbers primed as are employed for the like elements in the early warning zone channel. The video level discriminator 53 has two outputs which are applied as inputs of variable range gate circuits 66 and 66' of the range and azimuth control unit 56. Trigger signals are also applied to these variable range gates by the line 43 from the radar set. The variable range gate 66 serves to establish an adjustable range warning zone and for this channel this comprises the early range warning zone. A control 67 of the variable range gate adjusts the inner ring or distance of this warning zone and a second variable range gate control 68 sets the depth of the zone, i.e., the outer range of the zone. The early warning zone will thus be seen to be comprised of an annular area of interest about the radar set with the inner and outer diameters thereof being variable. The information as to these range settings, i.e., the inner and outer rings or diameters of the early warning zone, is applied through a display video control 69 to the input of a ring intensity control 71. This video information from the variable range gate is applied to the video mixer 32 of the radar set for tracing two visible rings on the PPI scope corresponding to the inner and outer limits of the early warning zone. The variable range gate 66 also serves to pass input video signals representing radar echo signals lying only within the defined limited range of the early warning zone. These gated signals are applied to a variable azimuth gate 72 which has start control means 73 and stop control means 74 so that the azimuth gate may be set at any desired starting point from 0°–360° and with any separation in degrees between beginning and ending of the gate limits. The variable azimuth gate controllably limits the azimuthal location and extent of the range lines on the PPI scope 39, as further described below. Radar echo signals that are gated through the variable azimuth gate 72 are applied to an echo width discriminator 76 which compares the number of individual consecutive radar pulse returns with a pre-set controllable minimum as set by the minimum control 77 so as to establish a minimum size of detected object which is accepted by the present invention. The echo width discriminator 76 also has a maximum control 78 to establish the maximum number of consecutive radar pulses to be passed thereby in order to eliminate the possibility of alarms by very large echoes such as land masses, if desired. The echo width discriminator 76 passes signals falling within the above-noted limits as set by the controls 77 and 78 and these are applied to an acquisition azimuth gate 79. Enabling of the gate 79 by an input signal from the echo width discriminator serves to establish an acquisition azimuth sector of 5° or some other adjustable number of degrees on each side of the azimuth of the detected object identified by the radar signal received from the echo width discriminator 76. It is noted that azimuth limit signals of the variable azimuth gate 72 are applied to the display video control 69 so that the range rings established by the variable range gate 66 normally appear only over the azimuth sector established by the variable azimuth gate 72. In addition the azimuth limit signals of the acquisition azimuth gate 79 are also applied to the display video control 69 so that, upon identification of a target within the early warning zone, the range rings are visible only over the 10° arc, for example, of the acquisition azimuth sector with such sector being centered on the target. Upon establishment of the acquisition azimuth sector the variable azimuth gate 72 is disabled by the acquisition azimuth gate 79 via line 80 so that only one set of azimuth signals is applied to the display video control 69. The effect of the signals generated by the present invention and the display thereof is further described below in connection with the description of FIGS. 5 to 7. The output of the acquisition azimuth gate 79 is applied to an echo verification discriminator 81 which counts the number of echo returns for the target appearing within the azimuth window for a predetermined number of sweeps of the radar antenna. It is noted that the "azimuth window" is herein defined as the area in the acquisition azimuth sector of the early warning zone. It is noted that the echo verification discriminator includes control means 82 for setting the required number of echo returns for a predetermined number of sweeps of the radar antenna in order to pass a signal from the discriminator 81. Signals passed by the discriminator 81 are applied to a display selector and display select logic circuit 83 which serves the purpose of energizing the alarm and display unit 57 and of applying certain signals back to the ring intensity control 71, as further described below. The display selector 83 may incorporate both manual and automatic means for switching signals to output display devices as received from the echo verification discriminators.

The range and azimuth control circuit 56 additionally includes an automatic electronic bearing indicator 86 which receives an input signal from the echo width discriminator 76 for generating a signal establishing an electronic bearing indicator line through the target PPI scope upon verification of the target echo by the echo width discriminator. The output of the electronic bearing indicator 86 is applied to the display selector for return to the radar set and the bearing indicator line tracks the target as long as it is in the warning range zone. There is also provided an azimuth timer and phase-locked loop 87 which receives the heading marker signal on line 41 from the radar system and a further input at terminal 88 from a bearing digital display, as described below, and applies correction signals to the variable azimuth gate 72 and automatic electronic bearing indicator 86. The alarm zone circuitry parallels the early warning zone circuitry; however, the above-described automatic electronic bearing indicator and azimuth timer and phase lock are common to both channels and each feed into the same display selector and display select logic 83.

Before proceeding with the description of the tow range and azimuth control 58 of FIG. 3, reference is made to FIG. 4 illustrating the alarm and display circuitry 57 which is operated by the range and azimuth control 56 described immediately above. The alarm and display circuitry 57 is connected to the display selector and display select logic circuitry 83 and the connecting lines are similarly numbered in FIGS. 3 and 4 for convenience in following signal flow between the circuits of these two figures. The alarm and display circuitry 57 includes a warning zone alarm 91 having an input line 92 carrying signals from the echo verification discriminator 81 of the early warning zone channel. This alarm will thus be automatically activated so that a visual and/or audio alarm occurs upon identification and verification of a target in the early warning zone established by the present invention. The present invention operates to actuate the alarm under the foregoing circumstances, even though the radar display may be inadvertently set to a shorter range than the range of the early warning zone. This then requires an operator to consider the threat imposed by this target and take action to make some change in course or speed of the vessel to remove the target from the early warning zone, to manually deactivate the alarm 91 by switching means 93 provided in connection therewith, or to change either the range zone or azimuth sector of the collision warning system. There is also provided an alarm zone alarm 94 having an input line 96 and receiving signals from the echo verification discriminator 81' of the alarm zone channel. The audio visual alarm zone alarm 94 will automatically operate upon the identification of a target in the alarm zone and, if this alarm is not deactivated after a predeterminable time by a manual command function switch 97 in the display selector 83, a signal will be applied on an input line 98 to a second stage alarm timer 99 which is connected to operate a second stage alarm audio generator and relay 101 which is connected to operate some type of further alarm such as a public address alarm, an external ship's whistle, a foghorn, or the like, as a second stage warning capability.

The present invention also provides for the digital display of bearing and range information of targets appearing within the early warning zone and alarm zone. Information for the range display is obtained from the video output of the variable range gates 66 and 66' via lines 102 and 102' to the display selector 83. Trigger signals are also applied from line 43 to the display selector 83 and trigger and range information is fed from the display selector 83 through a line 106 to a range digital display 107. A bearing digital display 108 receives bearing information and timing information via input line 109 from the automatic electric bearing indicator 86. It is noted with respect to the digital display of bearing information that any variation of the scan rate of the radar antenna 22 from normal could cause the digital bearing display to be incorrect and, furthermore, that inasmuch as the bearing information is repetitive, i.e., 0°–360°, it is necessary to re-set the counter of the display and thus there is provided an output signal corresponding to a 359° count at the display terminal 88 which is then applied as an input to the azimuth timer and phase-locked loop 87 wherein the phase-locked loop compares this count pulse from the display 108 with the heading marker synchronizing signal and applies a voltage to the azimuth gate timer to correct for antenna rotational speed variations and thereby provide accurate tracking of the azimuth gate 72, the automatic electronic bearing indicator 86 and the bearing digital display 108.

Figure 5:
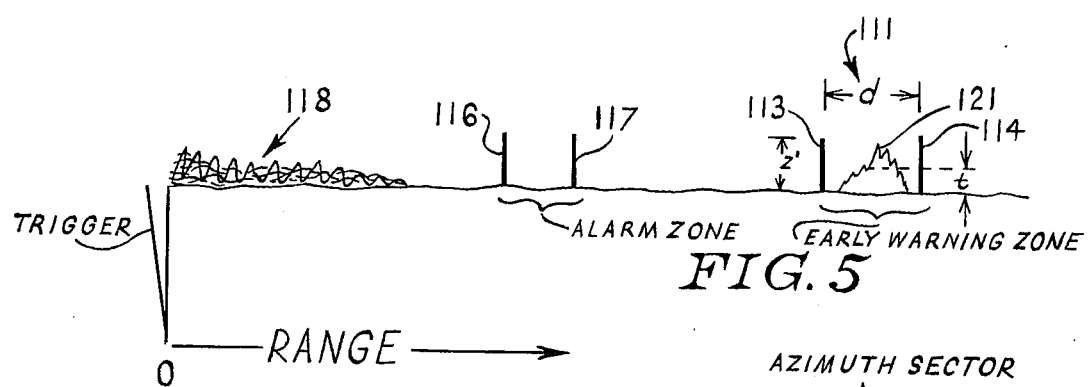
FIG. 5 is a diagrammatic representation of range zone signals in relation to radar return signals.
Figure 6:
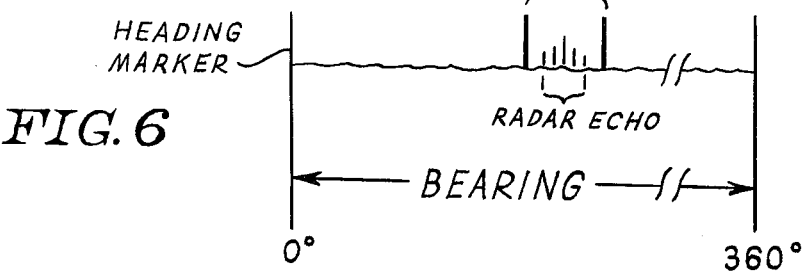
FIG. 6 is a diagrammatic representation of a generated azimuth sector in relation to a heading marker of a radar system.
Figure 7:
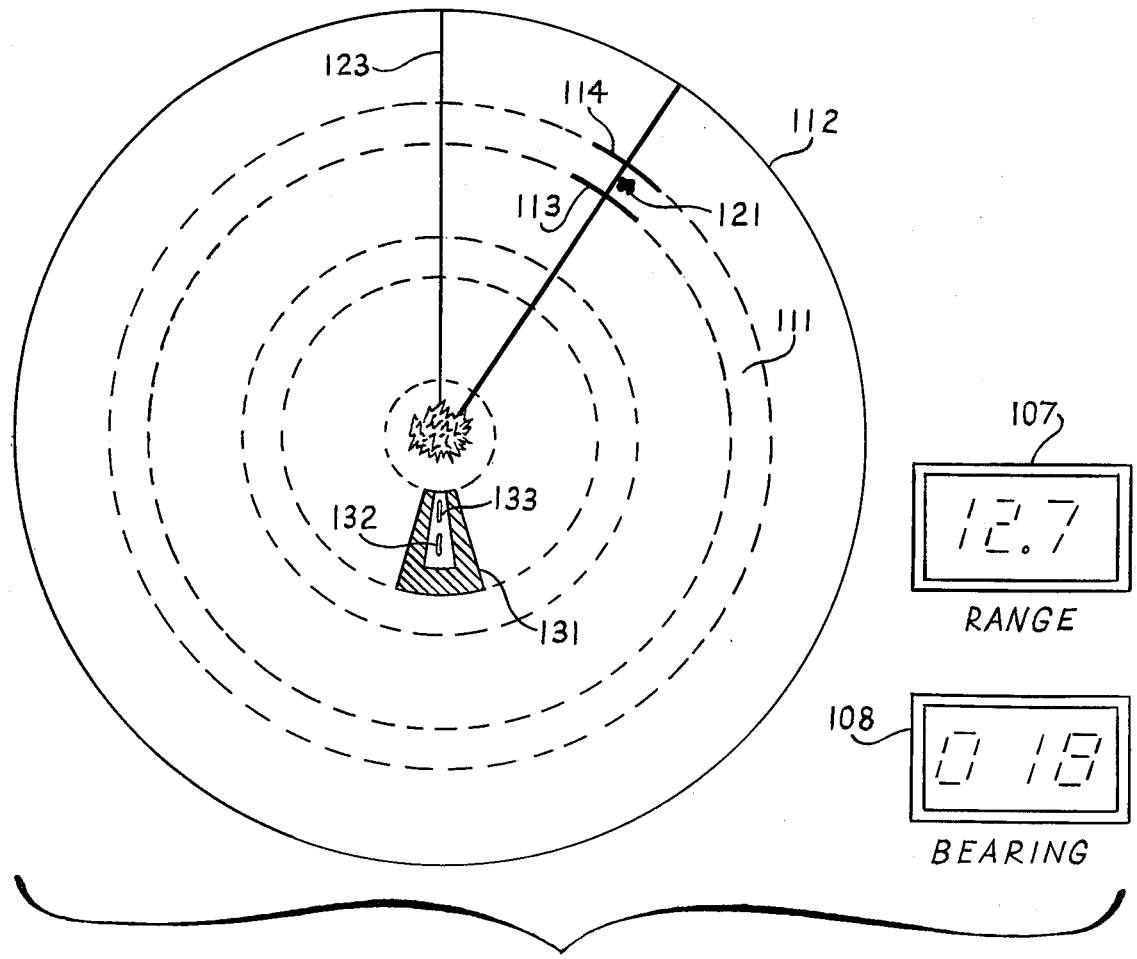
FIG. 7 is an illustration of a PPI scope visual display as produced by the present invention together with a digital display hereof representing the same information as shown on the PPI scope.

Reference is now made to the pictorial representations of FIGS. 5, 6 and 7. In FIGS. 5 and 7 there are illustrated the range zones and the early warning zone 111 is shown to be visually defined on the PPI scope 112 by concentric range lines or rings 113 and 114. It will be appreciated that the location of each of these rings 113 and 114 are controllable by the controls 67 and 68 of the variable range gate 66 so that the depth, d, of the zone 111 is adjustable as well as the range placement of the zone. The intensity, i, of the rings 113 and 114 are adjustable by the ring intensity control 71. There is also shown alarm zone rings 116 and 117 which may be adjustably positioned by controls on the variable range gate 66'. At the left of FIG. 5 there is illustrated radar returns 118 which are sometimes termed sea clutter or grass which normally occur close to the radar antenna and it will be appreciated that by the establishment of the alarm zone and early warning zone, these unwanted echoes are excluded from the present invention.

Radar echoes from a target 121 are shown to appear in the early warning zone 111 and the present invention provides an amplitude threshold, t, so that radar return signals must have an amplitude in excess thereof to enter the circuitry of the present invention. This threshold is set by the control 54 of the video level discriminator 53. Upon the entry of a radar echo signal into the present invention, there is produced an electronic bearing indicator line or cursor 122 extending radially of the PPI scope 112 across the beginning of the target indication 121 thereon. This cursor is generated by the automatic electronic bearing indicator 86 and, after this target has been determined to have a target width between the maximum and minimum as set by the controls 77 and 78 of the echo width discriminator 76, there is established an acquisition azimuth sector by the acquisition azimuth gate 79 which then serves to limit the extent of the visual range rings 113 and 114 on the scope to about 5° on opposite sides of the cursor 122. This is also illustrated in FIG. 6. The radar target 121 will thus be seen to be visually bracketed on the PPI scope 112 for the convenience of the operator.

The present invention furthermore provides a digital display of the range and bearing of the target 121. This is indicated in FIG. 7 where the range is indicated by the range digital display 107 and the bearing is indicated by the bearing digital display 108. A target so identified by the present invention will actuate an alarm so that a ship's operator will be forced to take some type of action as discussed above. It is noted further that there is normally displayed on the PPI scope 112 a heading marker 123 identifying the heading of the ship carrying the radar set and it is further noted that any radar target which maintains the same relative bearing and a decreasing range with time, is in fact on a collision course with a ship carrying the present invention. Commonly the digital bearing and range displays are located in proximity to the PPI scope 112 so that an operator at a glance may readily assess the situation to determine what course of action needs to be taken. The display of the present invention and the alarms thereof may also be remotely located from the bridge of a vessel and this is particularly advantageous for fishing vessels, for example, where the bridge is unmanned for extended periods.

The capabilities of the present invention may be employed for purposes other than collision warning and one such application comprises a tow safety system associated with the above-described circuitry of the present invention, as generally indicated in FIG. 1 by the tow transponder 23 and tow range and azimuth control 58. The purpose of this tow system is to indicate to the operator of a ship towing barges or the like any movement of the towed vessels outside of a controllably designated tow area. Inasmuch as vessels being towed are normally fairly close to the towing vessel, it is preferable to provide a transponder 23 on at least the last of the line of towed vessels in order to receive radar signals propogated by the antenna 22 and to return these signals with sufficient strength to prevent masking thereof by interference such as sea clutter. In FIG. 2 the transponder 23 is illustrated as conventionally comprising a transmit-receive switch 126 connected to a mixer 127 that is, in turn, connected to an IF detector 128 which feeds a transmitter 129 which has the output thereof connected through the switch 126 to the antenna 124. As noted above, the transponder 23 serves to assure the return of a strong signal to the radar antenna 22 and actually forms no separate part of the present invention.

The tow warning system operates to establish a tow warning zone 131 extending about the two safety zone 132, as indicated on the PPI scope 112 of FIG. 7. Vessels such as barges 133 indicated by small marks in FIG. 7 for convenience of description, are intended to be towed behind a vessel carrying a radar set located at the center of the scope 112 and to normally remain within the two safety zone 132. At any time a barge or towed vessel 133 moves outside of the safety zone 132 into the surrounding warning zone 131, the present invention will sound an alarm to indicate that the towed vessel has either swung laterally from its normal position or has possibly broken free and is lagging too far behind the towing vessel.

Referring now to FIG. 3 there will be seen to be shown a block diagram of the tow range and azimuth control 58 as including an input video level discriminator 136 having the input thereof connected to the output of the video amplifier 51. This video level discriminator 136 has a threshold control 137 so that the video signal levels may be adjusted separately from the range and azimuth control circuitry 56. Separate threshold adjustments are provided to compensate for the closer range settings and sea return encountered at these closer ranges. The output of the video level discriminator 136 is applied to the inputs of a pair of two warning range gates 138 and 139 which also receive trigger inputs on line 43 from the radar set. The tow side warning range gate 138 has minimum and maximum range controls 141 and 142 and is further controlled by a variable azimuth gate 143 having an input connected to an output of the azimuth timer 87 and including minimum and maximum outer azimuth control means 144 and 146. These outer controls set the outer side limits of the tow warning zone and the variable azimuth gate 143 also has minimum and maximum inner azimuth control means 147 and 148 which establish the bearings of the sides of the tow safety zone. The gated output of the range gate 138 thus comprises signals occurring in the side areas of the tow warning zone. In order to provide an end closure to the tow safety zone, the tow end warning range gate 139 is provided with minimum and maximum controls 151 and 152 to pass video signals in the range zone between the outer range lines of the tow warning zone and tow safety zone. The tow end warning range gate 139 is also controlled from the variable azimuth gate 143 to limit the circumferential extent of the zone defined by the gate 139 to the inner azimuth settings as determined by controls 147 and 148 of the azimuth gate. The output of the two range gates 138 and 139 are applied to a mixer or the like 153 so that the output thereof comprises video signals in the tow warning zone. The signals defining the tow warning zone are applied to the radar set in the same manner as range and azimuth signals are applied for collision warning as described above so as to trace upon the PPI scope 112 the inner and outer lines defining the tow warning zone and thus also the tow safety zone so that an operator may readily adjust the controls as identified above to establish a desired warning zone about one or more vessels being towed. Radar echo signals located in the tow warning zone will reach the mixer 153 and from there are applied to an echo width discriminator 156 and thence to an echo verification discriminator 157 and on to the display selector 83. The tow circuit echo width discriminator and echo verification discriminator operate in the same manner as similarly termed circuits or units in the early warning zone channel described above. The output of the tow warning system is applied through an output line 158 from the display selector 83 to a tow warning alarm 159, as shown in FIG. 4. Provision is also preferably made to energize a second stage alarm if the tow warning zone alarm continues to operate in excess of some predetermined time and this may be accomplished in the display selector and display select logic circuitry 83 which is shown to include a control or switch 161 for turning off the tow warning zone alarm. Failure to operate this switch 161 within some predetermined time after the tow warning alarm is energized then results in the circuitry 83 applying a signal to the output line 98 thereof for operating a second stage alarm, as described above.

Considering now the operation of the tow warning system, it is noted that limits of the sides of the tow warning zone 131 are established by adjusting the tow side warning range gate controls 141 and 142 and the tow warning azimuth gate controls 146, 147, 148 and 149. The tow safety zone perimeter which corresponds to the interior delineation of the tow warning zone has the outer end thereof closed by adjusting the controls 151 and 152 of the range gate 139. Consequently the radar echo from the tow safety zone will not actuate an alarm through the tow safety system; however, a signal generated in the tow warning zone will actuate the tow warning alarm 159.

The present invention may also incorporate additional capabilities which may be readily derived from the basic invention as described above. Thus it is possible to include the automatic tracking of one or more radar targets and the provision of alarm signals if such targets provide any possible threat of collision with the vessel carrying the present invention. It is also possible to extend the system of the present invention to an assessment of any threat of collision by deriving from the information available herein the time and location of the closest point of approach of a target and the closing rate thereof. The simple system of the present invention does provide basic information in highly usable form to assist the operator of a ship, for example, in the navigation thereof.

Although the present invention has been described and illustrated with respect to particular preferred embodiments thereof, it will be appreciated by those skilled in the art that variations, modifications and additions are possible within the scope of the present invention and thus it is not intended to limit the invention to the precise terms of description nor details of illustration.

I claim:

1. An automatic collision warning system adapted for use with a radar system having a display scope and generating echo signals containing information relative to bearing and range of targets reflecting radar pulses comprising a range gate connected to said radar system and having control means for setting maximum and minimum ranges to pass only echo signals from a range zone between these limits, means applying signals representative of said maximum and minimum ranges of said range gate to said radar system for display as range lines on said radar scope, target verification means connected to receive signals passed by said range gate and only passing echo signals of targets which repeat a predetermined number of times in a predetermined period of time, a variable azimuth gate connected in series with said range gate and having manually adjustable control means for presetting maximum and minimum degrees of bearing of radar echo signals passed thereby whereby said target verification means only receives echo signals in a predetermined controllable azimuth sector of radar operation, means connecting said variable azimuth gate to said radar system for limiting the angular extent of said range lines to the azimuth sector controllably set by said variable azimuth gate, and an alarm system connected to receive signals passed by said range and azimuth gates and target verification means and operated thereby to automatically produce an alarm indication upon actuation by received signals.

2. The system of claim 1 further defined by an automatic bearing indicator circuit connected to said variable azimuth gate and producing a bearing signal for a target echo signal passed thereby and adapted for connection to said radar system to display a bearing indicator line upon the scope thereof through a target in the range zone whereby said bearing indicator line automatically tracks a target in said range zone.

3. The system of claim 1 further defined by an acquisition azimuth gate connected to the output of said variable azimuth gate for defining a limited angular azimuth sector about a target echo and connected to apply signals representative thereof to said radar system for limiting the angular extent of said maximum and minimum range lines on said radar scope to said azimuth sector.

4. The system of claim 1 further defined by a digital range display and a digital azimuth display, both independent of said display scope, connected to receive echo signals passed by said range gate and said variable azimuth gate and digitally displaying the range and bearing of target echoes in the selected azimuth sector of said adjustable range zone.

5. The system of claim 1 further defined by digital range and digital azimuth display means independent of said display scope connected to the output of said target verification means for digitally displaying the bearing and range of target echoes, digital bearing counting means producing predetermined repetitive count signals, and an azimuth timer and phase lock loop connected to receive heading marker signals from said radar system and said count signals for producing timing signals applied to said variable azimuth gate.

6. An automatic collision warning system adapted for use with a radar system having a display scope and generating echo signals containing information relative to bearing and range of targets reflecting radar pulses comprising a general range gate connected to said radar system and having a maximum and a minimum range within which echo signals of said radar systems are passed, target verification means connected to receive signals passed by said general range gate and only passing echo signals of targets which repeat a predetermined number of times in a predetermined period of time, said general range gate comprising first and second variable range gates and said target verification means comprising first and second echo verification discriminators connected one to each variable range gate, means applying signals representative of maximum and minimum ranges of said variable range gates to said radar system for display as range lines on said radar scope, an alarm system connected to receive signals passed by said variable range gates and operated thereby to automatically produce an alarm indication upon actuation by received signals, said first variable range gate being adapted for controlled setting to define an early warning range zone and said second variable range gate being adapted for controlled setting to define an alarm zone of ranges less than those of the early warning range zone, said alarm systems including a warning zone alarm connected for activation by the output of said first echo verification discriminator and an alarm zone alarm connected for activation by the output of said second echo verification discriminator with said warning zone alarm having a manual deactivator and said alarm zone alarm sounding an emergency audio alarm, and first and second variable azimuth gates with each having controls for setting minimum and maximum degrees of bearing of radar echo signals passed thereby and connected in series with said first and second variable range gates respectively and adapted to control the azimuth over which range lines are displayed on said radar scope and over which target echo signals are applied to said first and second echo verification discriminators, respectively, whereby said alarms are only actuated by radar target echoes within preselected range and azimuth areas.

7. An automatic collision warning system adapted for use with a radar system having a display scope and generating echo signals containing information relative to bearing and range of targets reflecting radar pulses comprising a general range gate connected to said radar system and having a maximum and a minimum range within which echo signals of said radar system are passed, target verification means connected to receive signals passed by said general range gate and only passing echo signals of targets which repeat a predetermined number of times in a predetermined period of time, said general range gate comprising first and second variable range gates and said target verification means comprising first and second echo verification discriminators connected one to each variable range gate, means applying signals representative of said maximum and minimum ranges of said variable range gates to said radar system for display as range lines on said radar scope, an alarm system connected to receive signals passed by said variable range gates and operated thereby to automatically produce an alarm indication upon actuation by received signals, said first variable range gate being adapted for controlled setting to define an early warning range zone and said second variable range gate being adapted for controlled setting to define an alarm zone of ranges less than those of the early warning range zone, said alarm system including a warning zone alarm connected for activation by the output of said first echo verification discriminator and an alarm zone alarm connected for activation by the output of said second echo verification. discriminator with said warning zone alarm having a manual deactivator and said alarm zone alarm sounding an emergency audio alarm, first and second variable azimuth gates with each having controls for setting minimum and maximum degrees of bearing of radar echo signals passed thereby and connected in series with said first and second variable range gates respectively and adapted to control the azimuth over which range lines are displayed on said radar scope and over which target echo signals are applied to said first and second echo verification discriminators, respectively, and first and second echo width discriminators separately connected between said azimuth gates and echo verification discriminators and having controls for setting the minimum and maximum numbers of radar echoes that can pass therethrough in a predetermined period of time for adjustably setting the minimum and maximum size of radar target that can actuate the alarm system of the warning system.

8. An automatic tow warning system adapted for use with a radar set upon a towing vessel which produces target echo signals containing target bearing and range information comprising first and second variable range gates adapted for connection to a radar set to receive timing and echo signals therefrom and each having control means for adjustably defining a minimum and a maximum range to pass echo signals between such ranges, said range gates having substantially the same maximum ranges and said second range gate having a greater minimum range than said first range gate, a variable azimuth gate connected to said variable range gates and having control means for setting maximum and minimum bearings of a bearing sector of echo signals that will pass through said range gates, said azimuth gate also having control means for establishing a safety sector of predetermined maximum and minimum bearings intermediate the maximum and minimum bearings of said bearing sector wherein said first range gate will not pass echo signals containing such bearing information, whereby there is established a warning zone surrounding a safety zone with any echo signals of bearings and range falling within the boundaries of said warning zone being passed through said range gates, and alarm means connected to the output of said range gates and automatically operated by echo signals passed thereby to thus identify movement of towed vessels out of the safety zone into the warning zone.

9. The system of claim 8 further defined by a controllable amplitude discriminator connected in the input of said variable range gates for setting the minimum level of radar echo signals applied to the range gates, and a controllable echo signal width discriminator and an echo verification discriminator connected in series between the output of said range gates and said alarm means for passing target echo signals having a predetermined total duration between controllable limits and operating upon such passed target echo signals to pass a signal to the alarm means only after a predetermined number of repetitions thereof in a set time period.

* * * * *